United States Patent [19]
Vogelzang

[11] Patent Number: 5,766,003
[45] Date of Patent: Jun. 16, 1998

[54] SPACE HEATER WITH NOVEL FUEL LINE ASSEMBLY

[75] Inventor: Steven J. Vogelzang, Holland, Mich.

[73] Assignee: Vogelzang International Corporation, Holland, Mich.

[21] Appl. No.: 639,035

[22] Filed: Apr. 16, 1996

[51] Int. Cl.⁶ .................. F24H 3/02; F24H 3/04
[52] U.S. Cl. .................. 432/222; 126/110 B
[58] Field of Search .......... 432/222; 126/110 B, 126/110 C, 110 D, 104 R, 104 A

[56] References Cited

U.S. PATENT DOCUMENTS

| | | |
|---|---|---|
| 32,752 | 7/1861 | Case. |
| 350,544 | 10/1886 | McKenney et al.. |
| 0,468,065 | 2/1892 | Shedlock. |
| 1,109,920 | 9/1914 | Glauber. |
| 1,183,354 | 5/1916 | Dittman. |
| 1,327,106 | 1/1920 | Leahy. |
| 1,456,718 | 5/1923 | Anderson. |
| 2,307,616 | 1/1943 | Booth ................ 221/77 |
| 2,815,889 | 12/1957 | Stetz et al. ............. 222/189 |
| 3,984,132 | 10/1976 | Sarson ................. 285/222 |
| 4,036,402 | 7/1977 | Taylor ................. 222/1 |
| 4,081,238 | 3/1978 | Briggs et al. ........... 432/222 |
| 4,089,642 | 5/1978 | Briggs et al. ........... 432/222 |
| 4,340,362 | 7/1982 | Chalupsky et al. ....... 432/222 |
| 4,443,187 | 4/1984 | Shaftner et al. ......... 432/222 |
| 4,532,914 | 8/1985 | Thomas et al. .......... 126/110 C |
| 4,572,406 | 2/1986 | Pratt et al. ............ 222/39 |
| 4,640,446 | 2/1987 | Walker ................. 222/416 |
| 4,852,916 | 8/1989 | Johnson ................ 285/187 |
| 4,858,959 | 8/1989 | Parrow ................. 285/330 |

FOREIGN PATENT DOCUMENTS

| | | |
|---|---|---|
| 1187059 | 9/1959 | France. |
| 0013913 | 7/1898 | United Kingdom. |

Primary Examiner—Henry A. Bennett
Assistant Examiner—Gregory Wilson
Attorney, Agent, or Firm—Price, Heneveld, Cooper, DeWitt & Litton

[57] ABSTRACT

A liquid fuel space heater having a specially designed tank and fuel line assembly. The tank includes two capped openings. The first capped opening is an opening in which the fuel is permitted to be introduced. The second capped opening includes an opening in the top receiving a fitting to which a rigid metal tube is connected. A filter is connected to the lower end of the fitting so as to be located inside the tank.

9 Claims, 3 Drawing Sheets

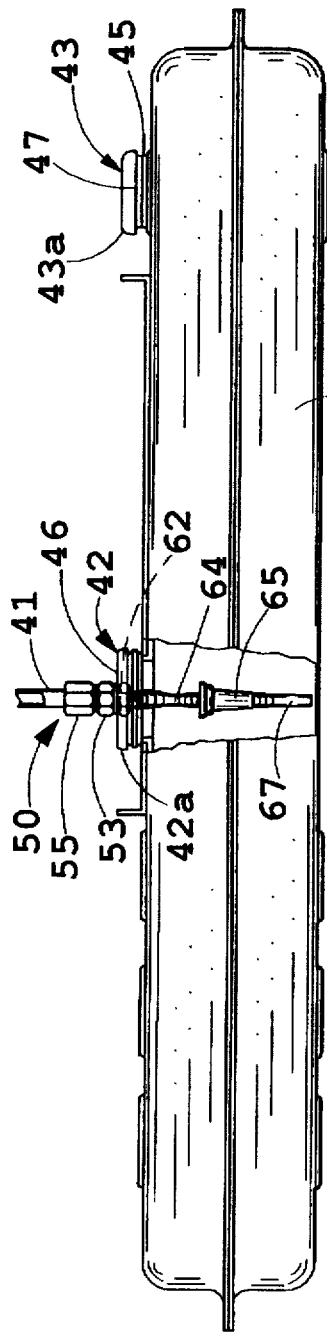
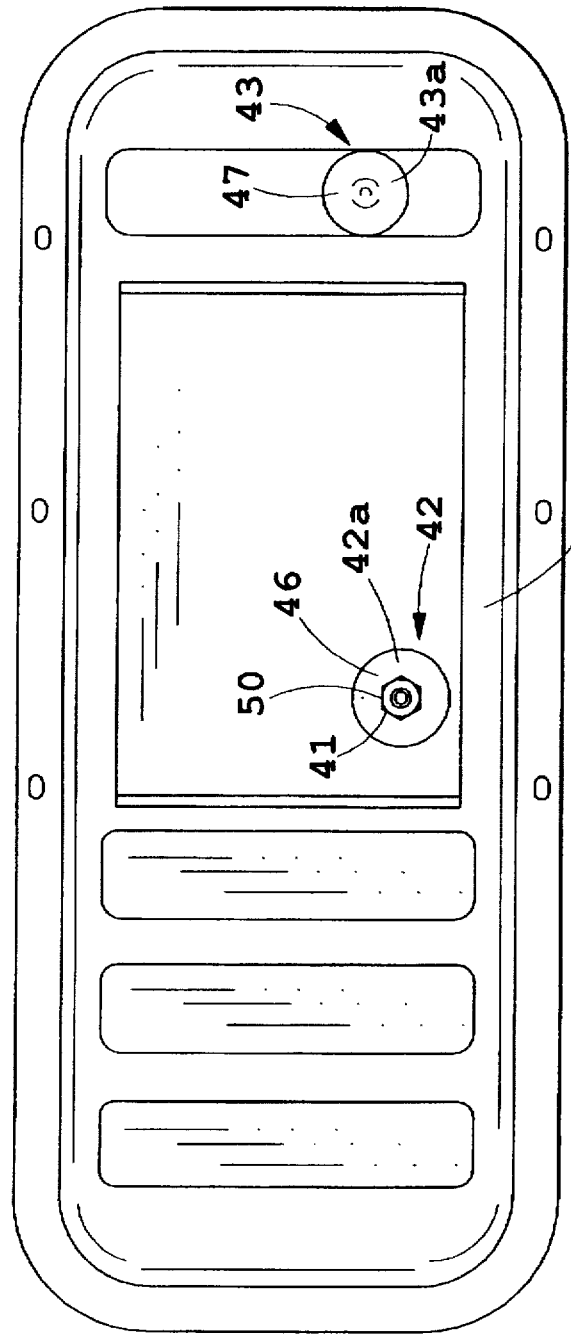

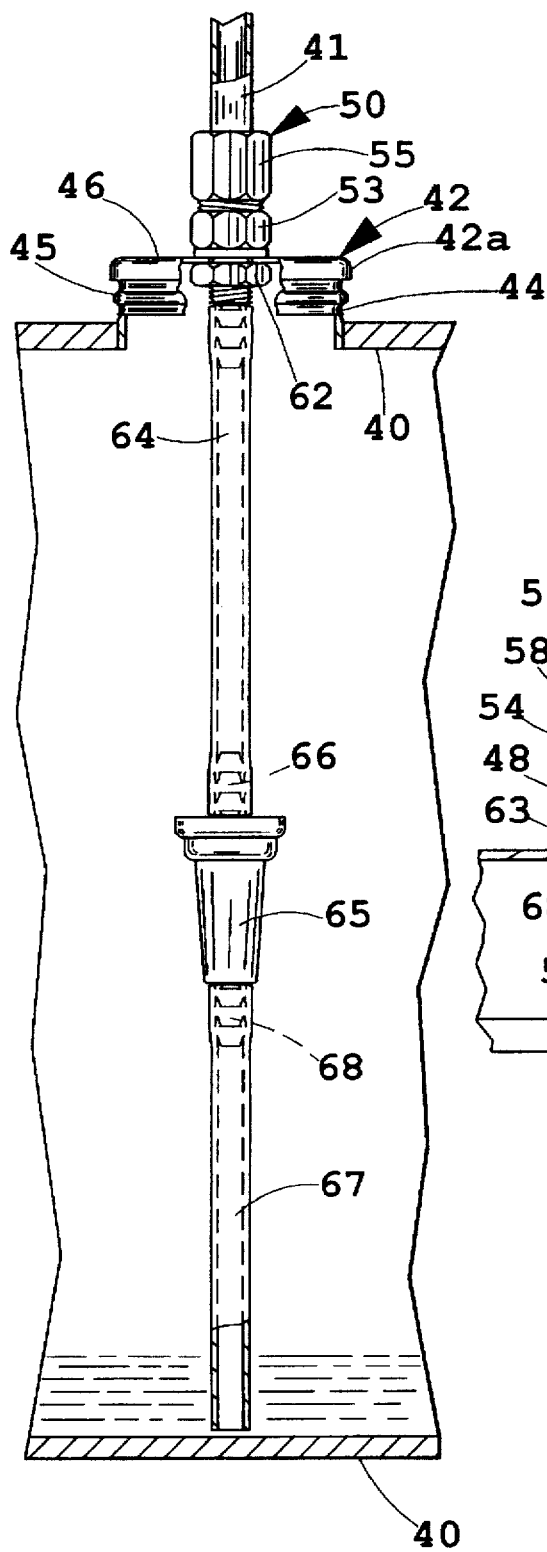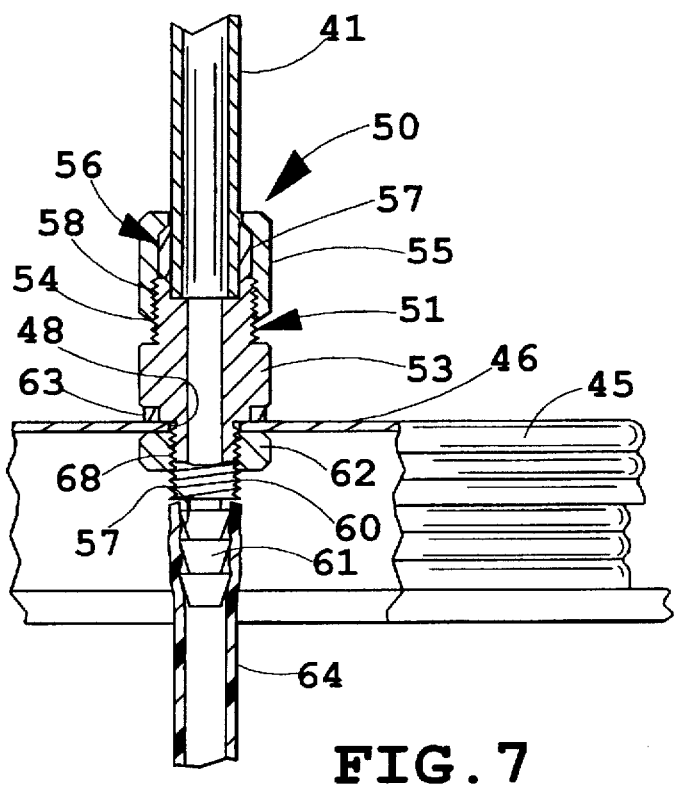
FIG. 6
FIG. 7

SPACE HEATER WITH NOVEL FUEL LINE ASSEMBLY

This invention relates to a space heater and particularly a portable space heater having a novel fuel line assembly.

BACKGROUND OF THE INVENTION

Portable heaters, have been in existence for a long time and have been the subject of much development effort. Examples of this type of portable heater is disclosed in U.S. Pat. Nos. 4,081,238 and 4,089,642. Because of the dangerous nature of such heaters, certain standards have been established by Underwriter Laboratories (UL). One such standard involves the fuel line assembly which is connected between the fuel tank and the fuel discharge nozzle which discharges fuel into the combustion chamber for ignition by an ignition element such as a spark plug. In order to meet UL approval the standard for the fuel line assembly requires a rigid metal tube connection between the fuel discharge nozzle assembly and the tank. Although meeting this standard is required to mark the space heater as having met UL approval, an addendum standard permits flexible hoses such as rubber or other synthetic material for transferring the fuel from the fuel tank to the nozzle of the burner. UL will not certify portable heaters that utilize a flexible hose. The flexible hose presents the problem of connecting the flexible hose securely to the tank and the nozzle assembly. Flexible rubber or synthetic rubber hose is subject to rot and deterioration. This problem is critical in that if the rubber hose is severed (cut) or broken between the tank and the fuel discharge nozzle assembly, fuel spills will result and catch on fire.

The challenging problem in utilizing a rigid metal tube such as steel, copper, or aluminum is the dilemma of how to connect the rigid metal tube to the tank and to the fuel filter and still have access to the inside of the tank to service the fuel filter. This problem has forced the present day manufactures of portable space heaters of the type as disclosed in U.S. Pat. Nos. 4,081,238 and 4,089,642 to utilize flexible hose and therefore the present day units have not met UL approval and cannot be marked as such (they have only been tested to the addendum standard). To date the reason for using the flexible hose is that those skilled in the art have not been able to conceive of any way to connect a rigid metal tube to the tank so that it is sufficiently secure and to eliminate the possibility of the rigid tube being disconnected from the tank by reason of movement, jarring, etc. of the portable heater. Apparently the manufactures of such portable heaters have relied upon the flexible hose to absorb any such jarring movements. This is dangerous in the fact that flexible hose can be jarred loose which could result in a fire.

SUMMARY OF THE INVENTION

This invention enables the use of a rigid metal tube to be connected to and extending between the nozzle assembly and the tank thus satisfying the UL standard.

The use of a rigid non-flexible tube in this combination is accomplished by providing a tank which has two capped openings. The first of the capped openings is a standard opening through which fuel is permitted to be poured into the tank. The second capped opening is substantially identical to the first mentioned capped opening, both of which have removable caps. The difference is in that the second cap which is removable from the additional capped opening has an opening in the top thereof, thus allowing it to receive a bulkhead fitting for connecting the rigid metal tube to the cap. This bulkhead fitting has at one end extending away from the tank a first connector portion connected to the rigid metal tube and at the other end is a second connector for operatively connecting the fuel filter thereto within the tank.

Preferably, both of the capped openings include an external threaded flange extending upwardly from the upper wall of the tank and a cap with a downwardly internal extending threads which mate with and receive the upwardly extending threaded flange.

Each of the caps have a top wall. The top wall of one cap includes an opening through which it receives a bulkhead fitting which includes an upper portion and a lower portion separated by a flange. The lower portion includes a threaded section immediately below said flange and a barbed connector section for connecting to a hose on which a filter is mounted. The upper portion includes a connector for connecting the rigid tube to the fitting. The lower portion of the fitting extends through the opening in the top wall of the said one cap. In this one cap the top wall is clamped between the flange of the fitting and a nut threaded onto the threaded section of the lower end of the fitting. This securely connects the fitting to the cap which in turn is secured to the tank by the internal threads of the cap. A rigid metal tube is connected to the upper portion of the fitting. A flexible hose is connected to the lower portion of the fitting which extends into the tank and on which a fuel filter is mounted. Preferably, the tank is constructed of a rigid plastic.

DRAWINGS

Referring to the drawings:

FIG. 4 is a side elevational view of the tank forming a part of this invention cut away to disclose the novel fuel line assembly;

FIG. 5 is a top plan view of the tank as disclosed in FIG. 4;

FIG. 6 is an enlarged cross sectional, cut-away section of the tank forming a part of this invention and disclosing a side elevational view of the fuel line assembly for the heater of my invention; and FIG. 7 is an enlarged cross sectional view of the connection of the rigid hose or tube to the tank of the portable heater.

DETAILED DESCRIPTION OF THE PREFERRED EMBODIMENT

Figure 1:
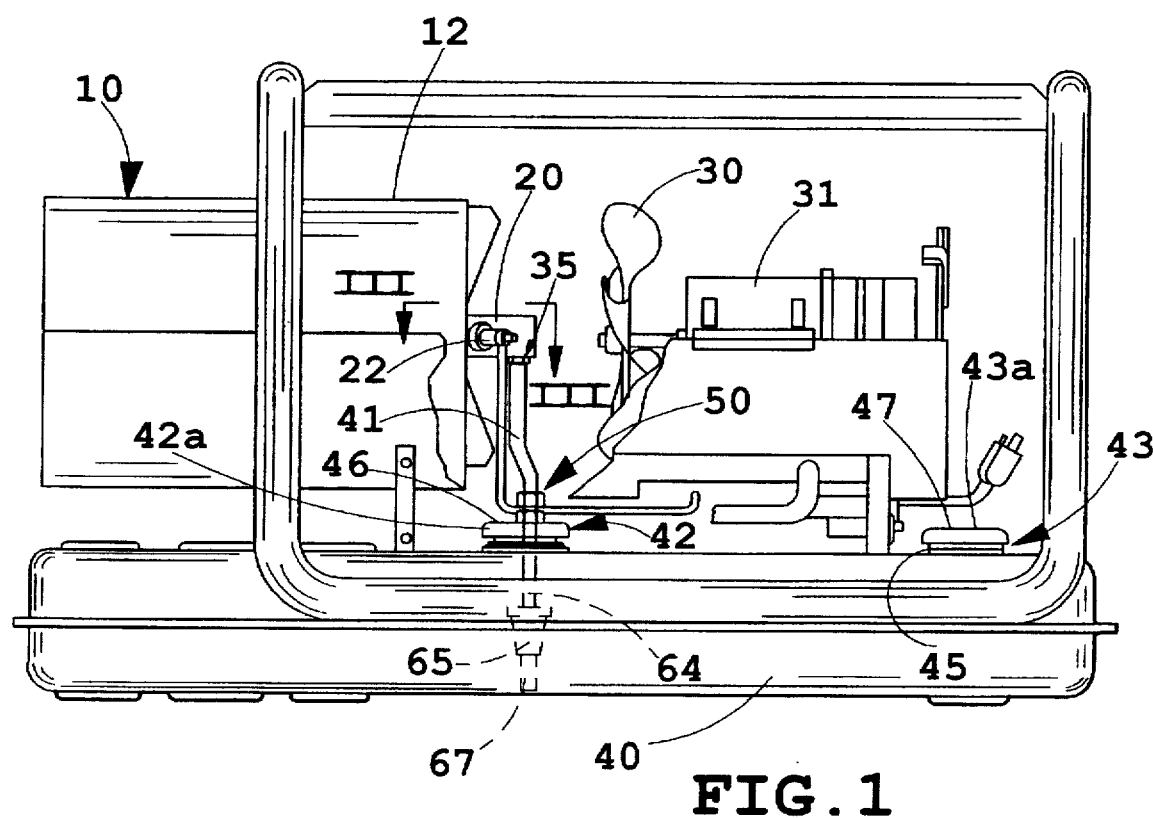
FIG. 1 is a side elevational view of the portable heater with a novel fuel line assembly in accordance with my invention.
Figure 2:
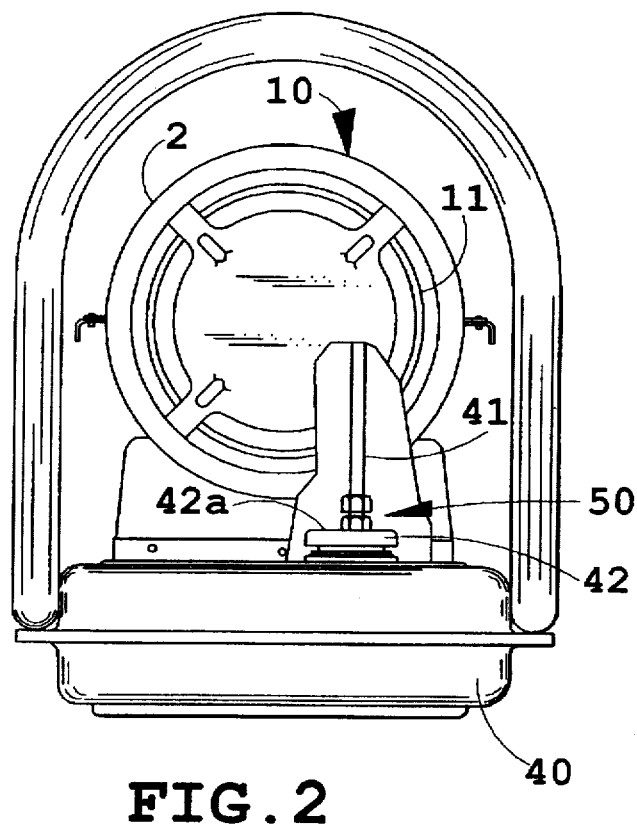
FIG. 2 is a front elevational view of the heater in FIG. 1 cut away to disclose a portion of the fuel line assembly.

Referring to the drawings, FIGS. 1 and 2 discloses the novel fuel line assembly in combination with various components which are generally included in portable heaters of this type. Reference number 1 designates the portable heater which includes the heater unit 10 comprising a combustion chamber 11 (FIG. 2) located within the cowling 12, the combustion chamber and cowling are supported in a well known manner such as the saddle shaped support member 13 which is not disclosed in FIG. 1 for reasons of clarity. A nozzle assembly 20 (FIGS. 1 and 3) is mounted at one end of the combustion chamber by the bracket 21 which also supports the ignitor 22 which in this instance is disclosed as a spark plug as is well known in the art The ignitor 22 is located immediately adjacent the nozzle 20 for igniting the fuel, which ignition is supported by an air supply means not disclosed. Suffice it to say that the combustion of the fuel takes place with in the combustion chamber 11.

Located rearwardly of the heating unit 10 is a fan 30 driven by the motor 31. The fan forces air through the heating unit 10 into the space to be heated. The nozzle is supplied fuel from the tank 40 through the metal rigid tube 41 which is an important element of the novel fuel line assembly. It should be understood the aforegoing sketchy structural description of the components of the portable heater provides the environment for the improved combination of the present invention, the features of which will now be more particularly described.

Figure 3:
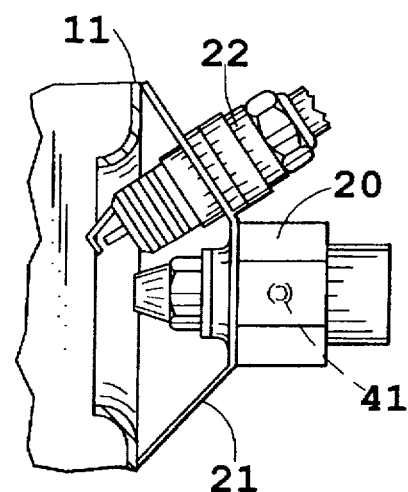
FIG. 3 is a partial cross section taken along the plane III—III of FIG. 1.

Referring to FIGS. 4–7 in conjunction with FIGS. 1, 2, and 3, an important and essential element of this invention is the rigid non-flexible metal tube 41 connected to and between the nozzle assembly 20 and the tank 40. As previously stated in the summary of this invention, although UL approval requires that the tube 41 be rigid and metallic, those skilled in the art have consistently used a flexible hose because of their inability to conceive of how a rigid metal tube with an attached fuel filter could be connected to the tank. It should be understood that by rigid metal tube is meant one constructed of a material such as steel, copper, or aluminum.

In accordance with my invention, I connect the rigid metal tube 41 to the tank 40 by providing a specially designed tank which includes two capped openings 42 and 43. These capped openings 42 and 43 include upwardly extending flanges 44 and 45, respectively, which are formed with threads on which the caps 42a and 43a, respectively, can be securely screwed. Caps 42a and 43a have the top walls 46 and 47, respectively. Top wall 47 is substantially closed except for a possible vent opening. Top wall 46 of cap 42a includes an opening 48 in which a specially designed bulkhead fitting 50 is secured so as to provide a secure connection of cap 42a to the rigid tube 41.

FIG. 7 discloses in greater detail the connection of fitting 50 to the cap 42a and also the connection of tube 41 to the bulkhead fitting 50. As disclosed in FIG. 7, bulkhead 50 includes an upper portion 51 and a lower portion 52 separated by a nut-like flange 53. The upper portion includes a threaded portion 54 on which the nut 55 is threaded. Nut 55 includes an inner expanding insert 56 which has a cylindrical portion 57 and a downwardly extended end 58 which tapers radially inwardly. Tube 41 is received within the element 57 and when inserted slightly flexes the tapered end 58 radially outward so that there is a tight fit between the element 57 and tube 41. In obtaining a secure and sealed connection between the upper portion 51 and tube 41, the tube is inserted in the element 57 contained within the nut 55 until it bottoms-out in the fitting. The nut 55 is first put on finger tight and then is secured with a wrench an additional 1¼ turns.

The bulkhead fitting 50 is secured to the top wall 46 preferably before connecting tube 41 to the upper portion 51 of the fitting 50. This is accomplished by inserting the lower portion 52 of fitting 50 through the opening 47 with the nut-like flange 53 abutting the top wall 46. As will be noted, the lower portion 52 of fitting 50 is threaded for a predetermined length to provide the threaded portion 60. Below threaded portion 60 a barbed connector portion 61 for a flexible hose is provided. Having inserted the lower portion 52 through opening 47, the nut 62 is threaded on the threaded portion 60 clamping the top wall 45 between the nut-like flange 53 and the nut 62 between which is provided an O-ring seal 63.

The fuel line assembly also includes a flexible hose 64 forced over the tubular barbed connector end 61 on the end of which fuel filter 65, which can be of many different designs, is mounted by means of the connector element 66. Another flexible hose 67 is mounted on the lower end of fuel filter 65 by means of the connector 68.

Having described in detail the various elements of my invention, it should become evident that I have accomplished by my invention that which those skilled in the art have failed to accomplish; that is, a portable heater in which the fuel line between the fuel discharge nozzle and the fuel tank can now be a rigid metal (copper, aluminum, or steel tube) member and which can be easily installed and still providing a means for changing the fuel filter in the fuel line. This is accomplished by providing a fuel tank with two capped openings 42 and 43. The capped opening 43 is utilized for filling the tank with fuel by easily unscrewing the cap 43a from the flange 45 in the well known standard method. Also, I provide a secure connection between tank 40 and rigid metal tube 41 while still permitting the replacement of the fuel filter 65. This is accomplished by disconnecting the end 35 of the rigid metal tube from the fuel discharge nozzle assembly 20 and then unscrewing the cap 42a from the upwardly extending flange 44 of the tank permitting the withdrawal of fuel filter 65 from the tank for replacement. The fuel filter 65 is then easily re-installed within the tank by inserting it through the capped opening 42 and tightening the cap 42a on the threaded flange 44.

While I have described specific structural features of my invention, it should be understood that the invention is not limited to such specific features and that other forms or modifications within the spirit of this invention are conceivable within one skilled in the art. Therefore this invention shall be limited only within the legitimate and valid scope of the appended claims.

The embodiments of the invention in which an exclusive property or privilege is claimed are defined as follows:

1. A portable space heater having a combustion chamber; a fuel discharge nozzle for discharging fuel into said combustion chamber; an ignition element located adjacent said fuel discharge nozzle; a fuel tank; a fuel line assembly extending between said fuel discharge nozzle and said tank; said fuel line assembly comprising:

- a rigid non-flexible metal tube extending between said nozzle and said tank;
- said tank having a bottom wall, side walls, and an upper wall;
- a first capped opening and a second capped opening in said upper wall;
- said first capped opening including a first threaded flange extending upwardly from said upper wall of the tank and a first cap with a first downwardly extending threaded flange received on said first threaded flange, said first cap having a first top wall, said first capped opening providing a opening for pouring fuel into said tank;
- said second capped opening including a second threaded flange extending upwardly from said upper wall and a second cap with a second downwardly extending threaded flange received on said second threaded flange, said second cap having a top wall with an opening therein for receiving a fitting;
- a fitting having an upper and lower portion separated by a flange, said lower portion including a threaded section immediately below said flange and a connector section for connecting to a rigid metal tube, said upper portion including a connector for connecting said rigid metal tube to said fitting, a nut threaded on said threaded section;

said lower portion of said fitting extending through said opening in the top wall of said second cap; said second top wall being located between said flange and said nut;

said rigid metal tube being connected to the upper portion of said fitting;

a first hose connected to the connector section of said fitting; and a fuel filter connected to said hose.

2. The portable space heater of claim 1 in which said rigid tube is a non-rustable metal tube.

3. The portable space heater of claim 1 in which said fuel filter has two ends, one end connected to said first hose and a second hose is connected to the other end of said fuel filter.

4. The portable space heater of claim 3 in which said first and second hoses are flexible.

5. A portable space heater of claim 1 in which said tank is constructed of a rigid plastic.

6. A portable space heater having a combustion chamber, a fuel discharge nozzle for discharging fuel into said combustion chamber; an ignition element located adjacent said fuel discharge nozzle; a fuel tank, a fuel line assembly extending between said fuel discharge nozzle and said tank, said fuel line assembly comprising:

a rigid non-flexible metal tube extending between said nozzle and said tank, said tank having a bottom wall, side walls, and an upper wall;

a first capped opening in the upper wall of said tank and having a first removable cap provided to be opened for permitting the pouring of fuel into said tank, a second capped opening in the upper wall of said tank and having a second removable cap, said second removable cap having an opening in the top thereof for receiving a fitting:

a fitting received within the opening in the top of said second removable cap, said fitting having one end extending away from said tank and having a first connector portion connected to said rigid metal tube and at the other end having a second connector portion for operatively connecting a fuel filter thereto;

a fuel filter assembly located inside said tank and operatively connected to said second connector;

said first and second caps having a top wall, said top wall of said second cap having an opening; and said fitting having an upper portion and a lower portion separated by a flange, said lower portion including a threaded section immediately below said flange and including said second connector portion for connecting to a fuel filter, said upper portion including said first connector portion for connecting said rigid metal tube to said fitting, a nut threaded on said threaded section of said lower portion;

said lower portion of said fitting extending through said opening of said second cap, said top wall of said second cap being clamped between said flange and said nut.

7. A portable space heater having a combustion chamber: a fuel discharge nozzle for discharging fuel into said combustion chamber: an ignition element located adjacent said fuel discharge nozzle; a fuel tank; a fuel line assembly extending between said fuel discharge nozzle and said tank; said fuel line assembly comprising:

a rigid non-flexible metal tube extending between said nozzle and said tank;

said tank having a bottom wall, side walls, and an upper wall;

a first capped opening in the upper wall of said tank and having a first removable cap provided to be opened for permitting the pouring of fuel into said tank;

a second capped opening in the upper wall of said tank and having a second removable cap, said second removable cap having an opening in the top thereof for receiving a fitting:

a fitting received within said opening in the top of said second removable cap, said fitting having at one end extending away from said tank and having a first connector portion connected to said rigid metal tube and at the other end having a second connector portion for operatively connecting a fuel filter thereto, a fuel filter assembly located inside said tank and operatively connected to said second connector portion;

said fuel filter having two ends, one end connected to a first hose, and a second hose connected to the other end of said fuel filter.

8. The portable space heater of claim 7 in which said first and second hoses are flexible.

9. A portable space heater having a combustion chamber, a fuel discharge nozzle for discharging fuel into said combustion chamber; an ignition element located adjacent said fuel discharge nozzle, a fuel tank; a fuel line assembly extending between said fuel discharge nozzle and said tank; said fuel line assembly comprising:

a rigid non-flexible metal tube extending between said nozzle and said tank;

said tank having a bottom wall, side walls, and an upper wall;

a first capped opening in the upper wall of said tank and having a first removable cap provided to be opened for permitting the pouring of fuel into said tank;

a second capped opening in the upper wall of said tank and having a second removable cap, said second removable cap having an opening in the top thereof for receiving a fitting;

a fitting received within the opening in the top of said second removable cap, said fitting having one end extending away from said tank and having a first connector portion connected to said rigid metal tube and at the other end having a second connector portion for operatively connecting a fuel filter thereto;

a fuel filter assembly located inside said tank and operatively connected to said second connector:

said capped openings being identical except for said first removable cap having an opening therein in which is mounted said fitting.

* * * * *

UNITED STATES PATENT AND TRADEMARK OFFICE
CERTIFICATE OF CORRECTION

PATENT NO. : 5,766,003  
DATED : June 16, 1998  
INVENTOR(S) : Steven J. Vogelzang Page 1 of 2

It is certified that error appears in the above-identified patent and that said Letters Patent is hereby corrected as shown below:

Column 1, line 10, "is" should be --are--.

Column 1, lines 38 and 39, "manufactures" should be --manufacturers--.

Column 1, line 49, "manufactures" should be --manufacturers--.

Column 2, line 7, before "downwardly" delete "a".

Column 2, line 55, "discloses" should be --disclose--.

Column 2, line 67, after "art" insert --.--.

Column 3, line 10, "aforegoing" should be --foregoing--.

Column 4, line 16, "providing" should be --provide--.

Column 4, line 35, "within" should be --to--.

Column 4, line 58, "a" should be --an--.

Column 5, line 41, after "having" insert --at--.

Column 5, line 42, delete "and having".

Column 6, line 1, ":" should be --;--.

Column 6, line 3, ":" should be --;--.

Column 6, line 17, ":" should be --;--.

UNITED STATES PATENT AND TRADEMARK OFFICE
CERTIFICATE OF CORRECTION

PATENT NO. : 5,766,003
DATED : June 16, 1998
INVENTOR(S) : Steven J. Vogelzang

It is certified that error appears in the above-identified patent and that said Letters Patent is hereby corrected as shown below:

Column 6, line 23, "," should be --;--.

Column 6, line 50, "having" should be --having at--.

Column 6, line 51, "tank and having" should be --tank--.

Column 6, line 56, ":" should be --;--.

Signed and Sealed this

Eighth Day of June, 1999

Attest:

Q. TODD DICKINSON

*Attesting Officer*   Acting Commissioner of Patents and Trademarks